US012795736B2

(12) United States Patent
Turtinen et al.

(10) Patent No.: US 12,795,736 B2
(45) Date of Patent: Nov. 10, 2026

(54) DEVICES AND METHODS FOR SUPPORTING FLEXIBLE UPLINK RESOURCE REQUEST

(71) Applicant: Nokia Technologies Oy, Espoo (FI)

(72) Inventors: Samuli Heikki Turtinen, Oulu (FI); Chunli Wu, Beijing (CN); Ping Yuan, Beijing (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 515 days.

(21) Appl. No.: 18/552,595

(22) PCT Filed: Mar. 30, 2021

(86) PCT No.: PCT/CN2021/084049

§ 371 (c)(1),
(2) Date: Sep. 26, 2023

(87) PCT Pub. No.: WO2022/204961

PCT Pub. Date: Oct. 6, 2022

(65) Prior Publication Data

US 2024/0163929 A1 May 16, 2024

(51) Int. Cl.
*H04W 74/0833* (2024.01)
*H04W 72/12* (2023.01)
*H04W 74/0836* (2024.01)

(52) U.S. Cl.
CPC ....... *H04W 74/0833* (2013.01); *H04W 72/12* (2013.01); *H04W 74/0836* (2024.01)

(58) Field of Classification Search
CPC ............. H04W 74/0833; H04W 72/12; H04W 74/0836; H04W 72/21; H04B 7/18558
See application file for complete search history.

(56) References Cited

U.S. PATENT DOCUMENTS

2010/0098011 A1* 4/2010 Pelletier ............ H04W 28/0278 370/329
2019/0191464 A1 6/2019 Loehr et al.
(Continued)

FOREIGN PATENT DOCUMENTS

CN 106856630 A 6/2017
CN 109392147 A 2/2019
(Continued)

OTHER PUBLICATIONS

R2-2108115, Discussion on Remaining MAC issues for NR NTN (Year: 2021).*
(Continued)

*Primary Examiner* — Ricky Q Ngo
*Assistant Examiner* — David M Kayal
(74) *Attorney, Agent, or Firm* — BURR & FORMAN LLP

(57) ABSTRACT

Various example embodiments relate to methods, devices and systems that support flexible uplink resource request. A terminal device may comprise at least one processor and at least one memory including computer program code. The at least one memory and the computer program code may be configured to, with the at least one processor, cause the terminal device to perform actions including triggering a buffer status report (BSR) by uplink data arrival on a logical channel, and selectively triggering one or both of a scheduling request (SR) procedure and a random access (RA) procedure based on a predetermined condition for transmission of the triggered buffer status report.

18 Claims, 7 Drawing Sheets

(56) References Cited

U.S. PATENT DOCUMENTS

| | | | | |
|---|---|---|---|---|
| 2021/0250989 | A1* | 8/2021 | Chin | H04W 76/27 |
| 2021/0400684 | A1* | 12/2021 | Kung | H04W 72/1268 |
| 2022/0377780 | A1* | 11/2022 | Khoshkholgh Dashtaki | H04W 72/21 |
| 2023/0217500 | A1* | 7/2023 | Loehr | H04W 74/0833 370/329 |

FOREIGN PATENT DOCUMENTS

| | | | |
|---|---|---|---|
| CN | 109951891 | A | 6/2019 |
| EP | 2301296 | B1 | 2/2012 |
| WO | 2010/002307 | A1 | 1/2010 |
| WO | 2021026118 | A1 | 2/2021 |

OTHER PUBLICATIONS

"3rd Generation Partnership Project; Technical Specification Group Radio Access Network; Solutions for NR to support non-terrestrial networks (NTN) (Release 16)", 3GPP TR 38.821, V16.0.0, Dec. 2019, pp. 1-140.

"Report of [Post112-e][152][NTN] UL scheduling enhancements", 3GPP TSG-RAN WG2 Meeting #113-e, R2-2100161, Agenda: 8.10.2.2, OPPO, Jan. 25-Feb. 5, 2021, pp. 1-19.

"3rd Generation Partnership Project; Technical Specification Group Radio Access Network; NR; Medium Access Control (MAC) protocol specification (Release 16)", 3GPP TS 38.321, V16.3.0, Dec. 2020, pp. 1-156.

International Search Report and Written Opinion received for corresponding Patent Cooperation Treaty Application No. PCT/CN2021/084049, dated Dec. 31, 2021, 9 pages.

"Enhancements on RACH in NTN", 3GPP TSG-RAN WG2 Meeting #113 electronic, R2-2101833, Agenda: 8.10.2.1, Asia Pacific Telecom, Jan. 25-Feb. 5, 2021, 4 pages.

"BSR over 2-step RA", 3GPP TSG-RAN WG2 #109 electronic, R2-2000390, Agenda: 6.13.4, Ericsson, Feb. 24-Mar. 6, 2020, pp. 1-4.

"On scheduling, HARQ, and DRX for NTN", 3GPP TSG-RAN WG2 #112, R2-2010168, Agenda: 8.10.2.2, Ericsson, Nov. 2-13, 2020, 13 pages.

"On scheduling, HARQ, DRX, RLC, and PDCP for NTN", 3GPP TSG-RAN WG2 Meeting #111, R2-2007714, Agenda: 8.10.2.1, Ericsson, Aug. 17-28, 2020, 10 pages.

"Discussion on remaining MAC issues for NR NTN", 3GPP TSG-RAN WG2 Meeting #115 Electronic, R2-2108115, Agenda: 8.10.2.2, Nokia, Aug. 16-27, 2021, 10 pages.

Chinese Office Action and Search Report issued in Chinese Patent Application No. 202180096544.0 mailed Apr. 8, 2026, all pages cited in its entirety.

* cited by examiner

DEVICES AND METHODS FOR SUPPORTING FLEXIBLE UPLINK RESOURCE REQUEST

RELATED APPLICATION

This application claims priority to PCT Patent Application No. PCT/CN2021/084049, filed Mar. 30, 2021, and entitled "DEVICES AND METHODS FOR SUPPORTING FLEXIBLE UPLINK RESOURCE REQUEST", which is incorporated herein by reference in its entirety.

TECHNICAL FIELD

Various example embodiments described herein generally relate to communication technologies, and more particularly, to methods, devices and systems that support flexible uplink resource requests.

BACKGROUND

Certain abbreviations that may be found in the description and/or in the figures are herewith defined as follows:

3GPP 3rd Generation Partnership Project
BSR Buffer Status Report
CE Control Element
C-RNTI Cell Radio Network Temporary Identifier
gNB next Generation Node-B
LCG Logical Channel Group
LCH Logical Channel
MAC Medium Access Control
NTN Non-Terrestrial Network
OTA Over The Air
PUCCH Physical Uplink Control Channel
PUSCH Physical Uplink Shared Channel
RA Random Access
RACH Random Access Channel
RRC Radio Resource Control
RSRP Reference Signal Received Power
RSRQ Reference Signal Received Quality
SINR Signal to Interference and Noise Ratio
SR Scheduling Request 3GPP has started a work item on non-terrestrial network (NTN) to introduce satellite links into 5G New Radio (NR). The non-terrestrial network brings about a number of advantages, including for example extending coverage to areas lacking terrestrial network infrastructure and providing reliable services.

SUMMARY

A brief summary of exemplary embodiments is provided below to provide basic understanding of some aspects of various embodiments. It should be noted that this summary is not intended to identify key features of essential elements or define scopes of the embodiments, and its sole purpose is to introduce some concepts in a simplified form as a preamble for a more detailed description provided below.

In a first aspect, an example embodiment of a terminal device is provided. The terminal device may comprise at least one processor and at least one memory including computer program code. The at least one memory and the computer program code may be configured to, with the at least one processor, cause the terminal device to perform actions including triggering a buffer status report (BSR) by uplink data arrival on a logical channel, and selectively triggering one or both of a scheduling request (SR) procedure and a random access (RA) procedure based on a predetermined condition for transmission of the triggered buffer status report.

In a second aspect, an example embodiment of a network device is provided. The network device may comprise at least one processor and at least one memory including computer program code. The at least one memory and the computer program code may be configured to, with the at least one processor, cause the network device to perform actions including providing configuration for selectively triggering one or both of a scheduling request (SR) procedure and a random access (RA) procedure to a terminal device.

In a third aspect, an example embodiment of a method implemented at a terminal device is provided. The method may comprise triggering a buffer status report (BSR) by uplink data arrival on a logical channel, and selectively triggering one or both of a scheduling request (SR) procedure and a random access (RA) procedure based on a predetermined condition for transmission of the triggered buffer status report.

In a fourth aspect, an example embodiment of a method implemented at a network device is provided. The method may comprise providing configuration for selectively triggering one or both of a scheduling request (SR) procedure and a random access (RA) procedure to a terminal device.

In a fifth aspect, an example embodiment of an apparatus implemented at a terminal device is provided. The apparatus may comprise means for triggering a buffer status report (BSR) by uplink data arrival on a logical channel, and means for selectively triggering one or both of a scheduling request (SR) procedure and a random access (RA) procedure based on a predetermined condition for transmission of the triggered buffer status report.

In a sixth aspect, an example embodiment of an apparatus implemented at a network device may be provided. The apparatus may comprise means for providing configuration for selectively triggering one or both of a scheduling request (SR) procedure and a random access (RA) procedure to a terminal device.

In a seventh aspect, an example embodiment of a computer program product is provided. The computer program product may be embodied in at least one computer readable medium and comprise instructions, when executed by at least one processor of a terminal device, causing the terminal device to carry out a method according to the aforementioned third aspect.

In an eighth aspect, an example embodiment of a computer program product is provided. The computer program product may be embodied in at least one computer readable medium and comprise instructions, when executed by at least one processor of a network device, causing the network device to carry out a method according to the aforementioned fourth aspect.

Other features and advantages of the example embodiments of the present disclosure will also be apparent from the following description of specific embodiments when read in conjunction with the accompanying drawings, which illustrate, by way of example, the principles of example embodiments of the present disclosure.

BRIEF DESCRIPTION OF THE DRAWINGS

Some example embodiments will now be described, by way of non-limiting examples, with reference to the accompanying drawings.

Throughout the drawings, same or similar reference numbers indicate same or similar elements. A repetitive description on the same elements would be omitted.

DETAILED DESCRIPTION

Herein below, some example embodiments are described in detail with reference to the accompanying drawings. The following description includes specific details for the purpose of providing a thorough understanding of various concepts. However, it will be apparent to those skilled in the art that these concepts may be practiced without these specific details. In some instances, well known circuits, techniques and components are shown in block diagram form to avoid obscuring the described concepts and features.

As used herein, the term "network device" refers to any suitable entities or devices that can provide cells or coverage, through which the terminal device can access the network or receive services. The network device may be commonly referred to as a base station. The term "base station" used herein can represent a node B (NodeB or NB), an evolved node B (eNodeB or eNB), or a gNB or an ng-eNB. The base station may be embodied as a macro base station, a relay node, or a low power node such as a pico base station or a femto base station. The base station may consist of several distributed network units, such as a central unit (CU), one or more distributed units (DUs), one or more remote radio heads (RRHs) or remote radio units (RRUs). The number and functions of these distributed units depend on the selected split RAN architecture. The base station may be deployed on the ground or in the sky, for example on a satellite, a high altitude platform station, an unmanned aircraft system, a balloon, an airplane, and/or the like.

As used herein, the term "terminal device" or "user equipment" (UE) refers to any entities or devices that can wirelessly communicate with the network devices or with each other. Examples of the terminal device can include a mobile phone, a mobile terminal (MT), a mobile station (MS), a subscriber station (SS), a portable subscriber station (PSS), an access terminal (AT), a computer, a wearable device, an on-vehicle communication device, a machine type communication (MTC) device, a D2D communication device, a V2X communication device, a sensor and the like. The term "terminal device" can be used interchangeably with a UE, a user terminal, a mobile terminal, a mobile station, or a wireless device.

Figure 1:
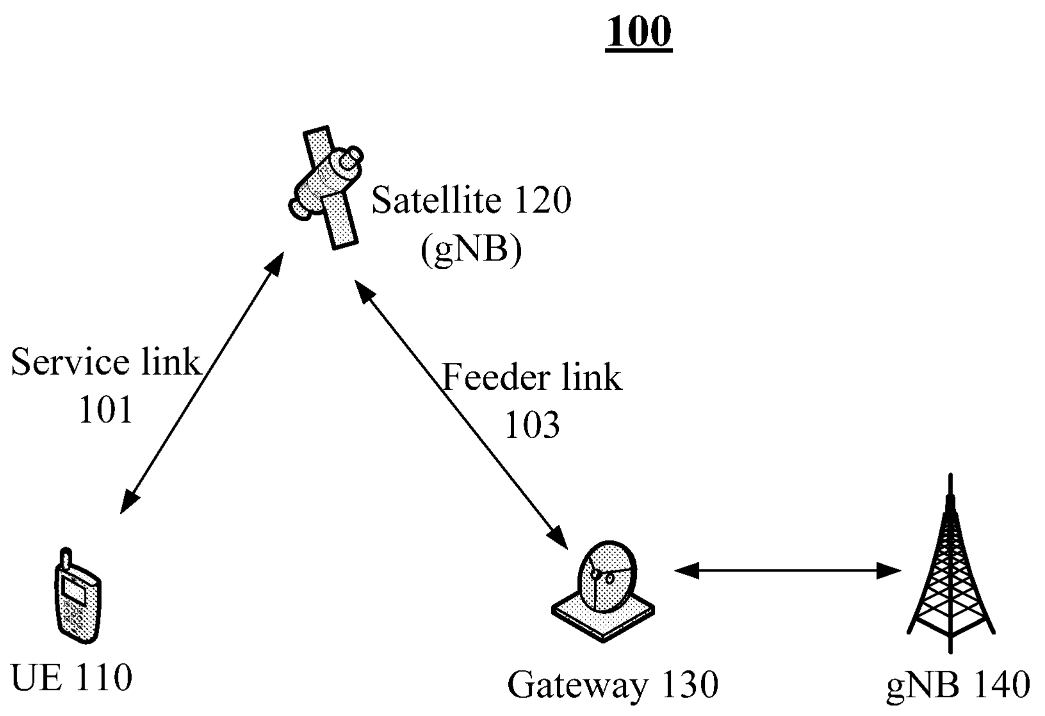
FIG. 1 is a schematic diagram illustrating a non-terrestrial network architecture in which example embodiments of the present disclosure can be implemented.

FIG. 1 is a schematic diagram illustrating a non-terrestrial network architecture 100 in which example embodiments of the present disclosure can be implemented. Referring to FIG. 1, the non-terrestrial network (NTN) architecture 100, which may be integrated as a part of a cellular communication network, may include a user equipment (UE) device 110, a satellite 120, an NTN gateway 130 and a terrestrial base station shown as gNB 140. The UE 110 may communicate with the satellite 120 via a service link 101, and the satellite 120 may communicate with the gateway 130 via a feeder link 103. Although one satellite 120 is shown in FIG. 1, there may be a plurality of satellites 120 which may communicate with each other via inter satellite links (ISLs). The gateway 130 provides interconnection between the satellite 120 and terrestrial infrastructures such as the gNB 140, a core network (not shown), a data network and the like.

The satellite 120 may be implemented as a so called transparent satellite or regenerative satellite. For the transparent satellite, the payload thereof acts as an analogue radio frequency repeater to implement frequency conversion and Radio Frequency amplification for both the service link 101 and the feeder link 103. The transparent satellite repeats the NR radio interface from the service link 101 to the feeder link 103 and vice versa, and the satellite radio interface (SRI) on the feeder link 103 is the NR-Uu interface. That is to say, the transparent satellite does not terminate NR-Uu. The gateway 130 supports functions to forward NR-Uu interface signals. For the regenerative satellite, the payload thereof implements regeneration of signals received from the service link 101 and the feeder link 103. The NR-Uu radio interface is on the service link 101, and the satellite radio interface, which may be implemented as e.g. N2/N3 interfaces, is on the feeder link 103. That is to say, a base station e.g. gNB is deployed on the satellite 120. It would be appreciated that the satellite 120 may also be replaced by e.g. an airplane, a balloon, a high altitude platform station, an unmanned aircraft system and/or the like.

Figure 2:
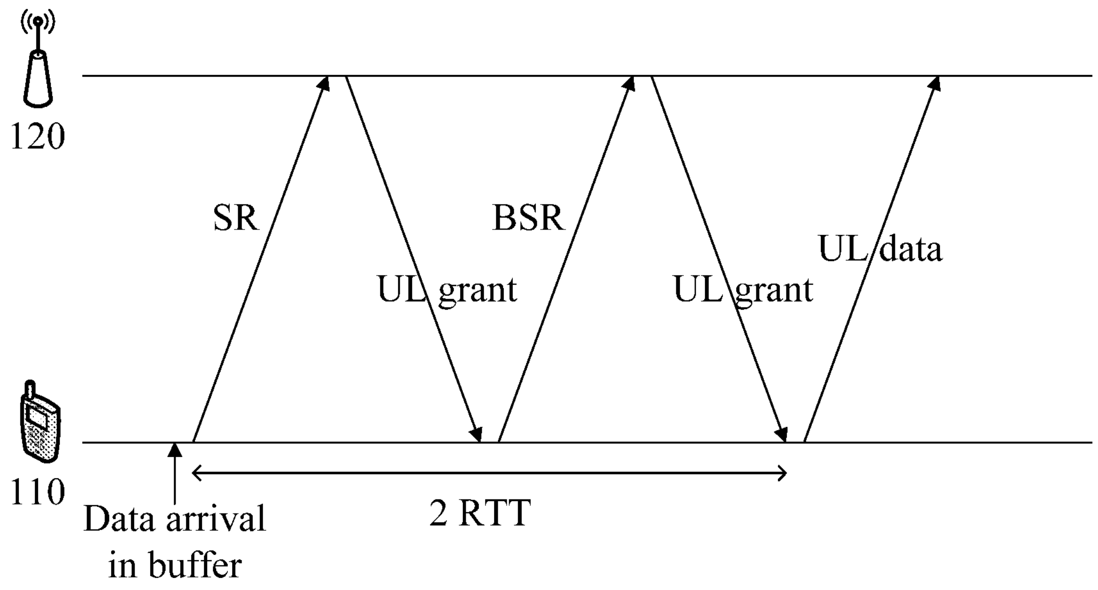
FIG. 2 is a schematic message flow diagram illustrating a procedure for scheduling uplink data transmission in a legacy communication system.

To support the NR radio access for satellite links, a long round trip delay (up to 541 ms) caused by the distance between the UE 110 and the satellite 120 is one issue to be addressed. FIG. 2 shows a message flow diagram of a procedure for scheduling uplink data transmission in a legacy communication system. Referring to FIG. 2, when new uplink data arrives in a buffer of the UE 110 in the RRC-Connected mode, the UE 110 may trigger a buffer status report (BSR) to inform the gNB 120 how much data is in the UE buffer to be transmitted so that the gNB 120 would allocate a UL grant for the uplink data transmission.

However, the UE 110 may have no UL-SCH resourceS for transmission of the BSR, then it triggers a scheduling request (SR) and sends the SR to the gNB 120 using configured PUCCH (physical uplink control channel) resources. Responsive to the SR, the gNB 120 will allocate a UL grant for the UE 110, on which the BSR may be transmitted to the gNB 120 so that the gNB 120 gets to know how much data is to be transmitted at the UE 110. In response to the received BSR, the gNB 120 allocates a UL grant for the UE 110 to transmit the uplink data. As seen, the BSR-SR procedure takes two round-trip-times (RTTs) from data arrival in the buffer of the UE 110 to the moment when the UE 110 is properly scheduled with resources that fit the data volume and needed Quality of Service (QoS). If the gNB 120 is deployed on a satellite or communicates with the UE 110 via a satellite, the BSR-SR procedure would cause significant over-the-air (OTA) delay.

In the legacy system, a random access (RA) procedure is used as a fallback mechanism for the SR procedure. In particular, if the UE 110 has no valid PUCCH resource configured for a pending SR or the UE 110 has attempted to transmit an SR by a maximum number of times, the UE 110 will initiate the RA procedure, and a BSR MAC CE may be transmitted via Msg. 3 in a 4-step RA procedure or via Msg. A in a 2-step RA procedure. The RA procedure can improve success chance of transmitting the BSR, but it cannot reduce the OTA delay associated with the non-terrestrial network since it is carried out after the SR procedure.

A more efficient way for uplink resource request will be described below. In some example embodiments, a flexible triggering strategy may be used for the SR procedure and the RA procedure. Responsive to a BSR being triggered, the SR procedure, the RA procedure, or both the SR procedure and the RA procedure may be triggered depending on predetermined conditions. The triggered RA procedure may be a 2-step RA procedure. Compared with the SR procedure and the 4-step RA procedure which take at least two RTTs to receive an UL grant for uplink data transmission, the 2-step RA procedure may reduce one RTT because the BSR can be transmitted in Msg. A. If both the SR and RA procedures are triggered, the BSR can be encoded to a first UL grant available based on the SR procedure or the RA procedure. In this way uplink data can be transmitted in a more timely manner and the OTA delay may be improved. It would be appreciated that the example embodiments discussed here may be applied to non-terrestrial networks and terrestrial networks.

Figure 3:
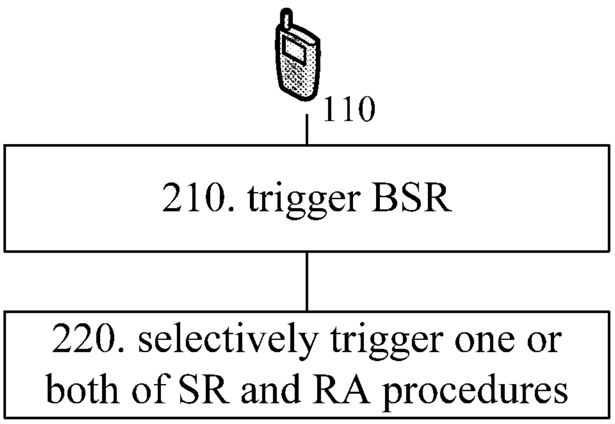
FIG. 3 is a schematic flowchart illustrating a method for requesting resources for uplink data transmission according to an example embodiment.

FIG. 3 is a schematic flowchart illustrating a method for requesting resources for uplink data transmission according to an example embodiment. The method of FIG. 3 may be implemented at a user equipment device connected to a non-terrestrial network or a terrestrial network, such as the UE 110 described above.

Referring to FIG. 3, at 210, the UE 110 may trigger a buffer status report (BSR) upon uplink data arrival of a logical channel. In some embodiments, the BSR may be triggered when certain events occur. For example, if the uplink data belongs to a logical channel with higher priority than the priority of any logical channel containing available uplink data which belong to any logical channel group, or none of the logical channels which belong to a logical channel group contains any available uplink data, the BSR would be triggered. It would be appreciated that the example embodiment is not limited to the aforementioned example events, and the BSR may also be triggered in response to some other events.

Then at 220, the UE 110 may selectively trigger one or both of a scheduling request procedure and a random access (RA) procedure based on a predetermined condition for transmission of the BSR. Depending on the predetermined condition, the UE 110 may trigger the SR procedure, the RA procedure, or both the SR and RA procedures at 220, which will be discussed in detail later.

The triggered RA procedure may be a 2-step RA procedure so that the BSR may be transmitted via Msg. A, which can reduce the uplink scheduling delay by one RTT compared with the SR procedure and the 4-step RA procedure that consume at least two RTTs for the uplink scheduling. In some embodiments, when the RA procedure is triggered at 220, either alone or along with the SR procedure, the UE 110 may perform RA type evaluation to select between the 2-step RA procedure and the 4-step RA procedure. For example, the UE 110 may measure a reference signal received power (RSRP) and compare the measured RSRP (L1-RSRP) or its filtered value (L2/L3-RSRP) with a predetermined threshold. The predetermined threshold may be referred to as a RA type selection threshold and it may be configured by the network. For example, the network may configure the RA type selection threshold by a parameter msgA-RSRP-Threshold. If the measured RSRP is higher than or equal to the threshold, the UE 110 will select and perform the 2-step RA procedure. On the other hand, if the measured RSRP is lower than the threshold, which indicates that the 2-step RA procedure cannot be selected and instead the UE 110 has to perform the 4-step RA procedure, then the UE 110 may stop the RA procedure and trigger the SR procedure if it has yet to be triggered or the SR procedure was not triggered before. In some embodiments, the RA type evaluation may be performed before the operation 220 to make sure that the 2-step RA procedure would be triggered. As such, the UE 110 can avoid the unnecessary 4-step RA procedure. It would be appreciated that other measurements like reference signal received quality (RSRQ), signal to interference and noise ratio (SINR) may also be used in the RA type selection evaluation.

As mentioned above, the BSR may be transmitted via Msg. A in the triggered 2-step RA procedure. When the UE 110 receives a network response including a UL grant (e.g. DCI format 0) for uplink data transmission, the UE 110 may stop/cancel the SR procedure if it has been triggered at 220. It is usually expected that the UE 110 would receive a UL grant from the 2-step RA procedure earlier than from the SR procedure because the 2-step RA procedure is one-RTT faster than the SR procedure. In some embodiments, when the UE 110 receives a UL grant (e.g., by DCI format 0) for uplink data transmission, the UE 110 may stop/cancel the RA procedure and/or the SR procedure if they are ongoing and initiate uplink data transmission on the UL grant, regardless which procedure the UL grant is received from.

In some embodiments, before the operation 220, the UE 110 may determine that a condition for triggering the SR procedure is satisfied. In other words, the UE 110 may make sure that the SR procedure can be triggered, and then it will selectively trigger one or both of the SR procedure and the RA procedure based on the predetermined conditions at 220. For example, if the UE 110 detects that there is no UL-SCH resource available for a new transmission, or that the MAC entity is configured with configured uplink grant(s) and the BSR is triggered for a logical channel for which the SR procedure is allowed, or that the UL-SCH resources available for a new transmission do not meet the logical channel prioritization (LCP) mapping restrictions configured for the logical channel that triggers the BSR, the UE 110 may determine the SR procedure can be triggered. It would be appreciated that under some other conditions the UE 110 may also determine that the SR procedure can be triggered. In some embodiments, if the UE 110 determines that the SR procedure cannot be triggered, the UE 110 may trigger the RA procedure, either a 2-step RA procedure or a 4-step RA procedure, and the operation 220 may not be performed.

Hereinafter some examples of selectively triggering one or both of the SR procedure and the RA procedure would be described with reference to FIGS. 4-8. It would be appreciated that the example embodiments are not limited to such examples.

Figure 4:
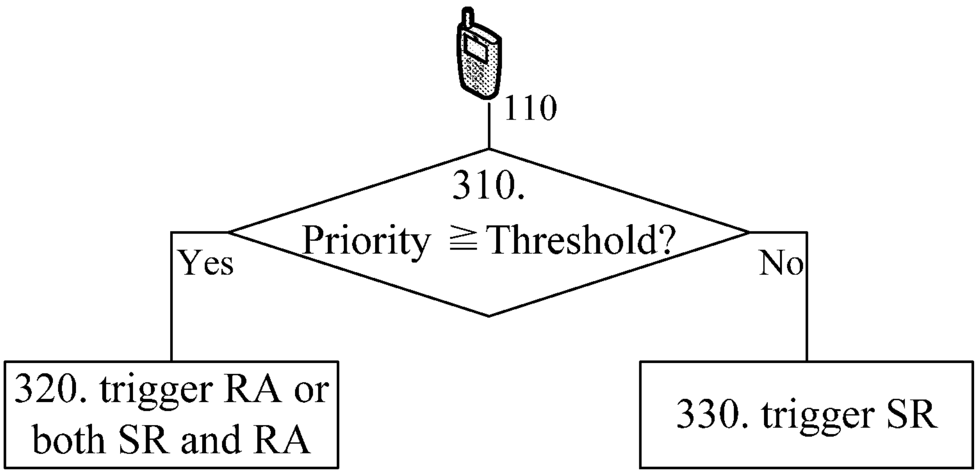
FIG. 4 is a schematic flowchart illustrating an example of selectively triggering one or both of a scheduling request procedure and a random access procedure according to an example embodiment.

FIG. 4 is a schematic flowchart illustrating an example of selectively triggering one or both of the SR procedure and the RA procedure according to an example embodiment. Referring to FIG. 4, at 310, the UE 110 may determine if the logical channel which triggers the BSR has a priority higher than or equal to a priority threshold. In some embodiments, the priority threshold may be configured by the network as an absolute priority threshold. For example, the network may specify a priority level as the threshold for the UE 110. In some embodiments, the priority threshold may be configured by the network as a relative threshold. If one or more logical channels, other than the logical channel which triggers the BSR, have uplink data available in the buffer, the relative threshold may be calculated from the highest priority of the one or more logical channels no matter to which logical channel group they belong to. If none of the other logical channels contains data available in the buffer, the relative threshold may be calculated from the lowest priority of the other logical channels. For example, the relative threshold may be calculated as ($P_{LCH}$+Tr) where $P_{LCH}$ represents the highest priority of the logical channels with data available other than the logical channel which triggers the BSR, or the lowest priority of the logical channels containing no data when none of the logical channels configured for the UE 110 other than the logical channel which triggers the BSR contains available uplink data in the buffer, and Tr represents a relative threshold parameter configured by the network. The relative threshold parameter Tr may have a positive value if an increasing priority value indicates a higher priority level, a negative value if an increasing priority value indicates a lower priority level, or a zero value. In some examples, the logical channels that are taken into account for the relative threshold determination may be logical channels that belong to the substantially same logical channel group as the logical channel which triggers the BSR. In some other examples, in case none of the logical channels have data, the relative threshold is calculated based on the lowest priority logical channel in the logical channel group as the logical channel which triggers the BSR. In some other examples, in some of the logical channels contain data, the relative threshold is calculated based on the highest priority logical channel in all or some logical channel groups.

If the UE 110 determines at 310 that the logical channel which triggers the BSR has a priority higher than or equal to the priority threshold, it knows the new uplink data to be transmitted has a high priority and may trigger the RA procedure or both the SR procedure and the RA procedure at 320. As discussed above, the 2-step RA procedure may reduce the uplink scheduling delay by one RTT, and the parallel SR and RA procedures may operate to schedule the uplink transmission in a more timely manner. If the UE 110 determines at 310 that the logical channel which triggers the BSR has a priority lower than the priority threshold, it knows the new uplink data to be transmitted does not have sufficiently high priority and may trigger the SR procedure. In this way, the procedure of FIG. 4 can trigger the RA procedure for high priority data transmission and avoid unnecessary RA procedure for low priority data transmission.

Figure 5:
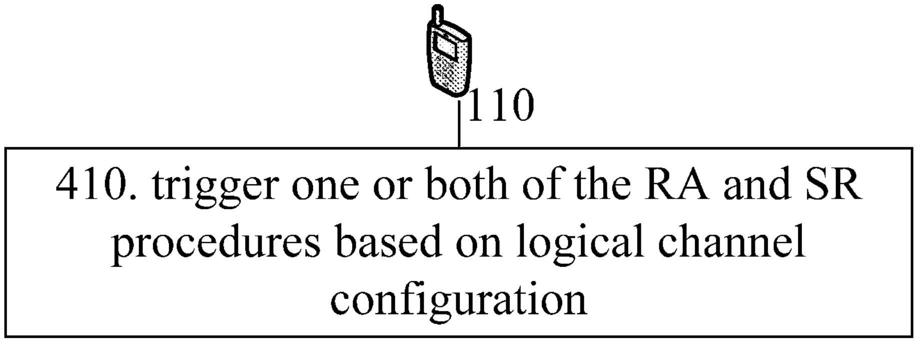
FIG. 5 is a schematic flowchart illustrating an example of selectively triggering one or both of a scheduling request procedure and a random access procedure according to an example embodiment.

FIG. 5 is a schematic flowchart illustrating an example of selectively triggering one or both of the SR procedure and the RA procedure according to an example embodiment. Referring to FIG. 5, at 410, the UE 110 may trigger one or both of the SR procedure and the RA procedure based on configuration of the logical channel which triggers the BSR. For example, the network may configure the UE 110 to specify which logical channel of the UE 110 to trigger which procedure(s), i.e., the RA procedure, the SR procedure, or both the RA and SR procedures. Alternatively or additionally, the network may configure the UE 110 to specify which logical channel group of the UE 110 to trigger which procedure(s). Then, if a logical channel has new data arrival and a BSR is triggered, the UE 110 may trigger one or both of the RA and SR procedures based on the configuration of the logical channel or logical channel group. In some embodiments, the network may configure the UE 110 to enable or disable selective triggering of the RA and SR procedures for logical channels or logical channel groups of the UE 110. If the BSR is triggered for data arrival of a logical channel for which selective triggering is enabled, the UE 110 may trigger the RA procedure or both the RA and SR procedures for the logical channel. On the other hand, if selective triggering is disabled for the logical channel, then the UE 110 would trigger the SR procedure for the logical channel.

Figure 6:
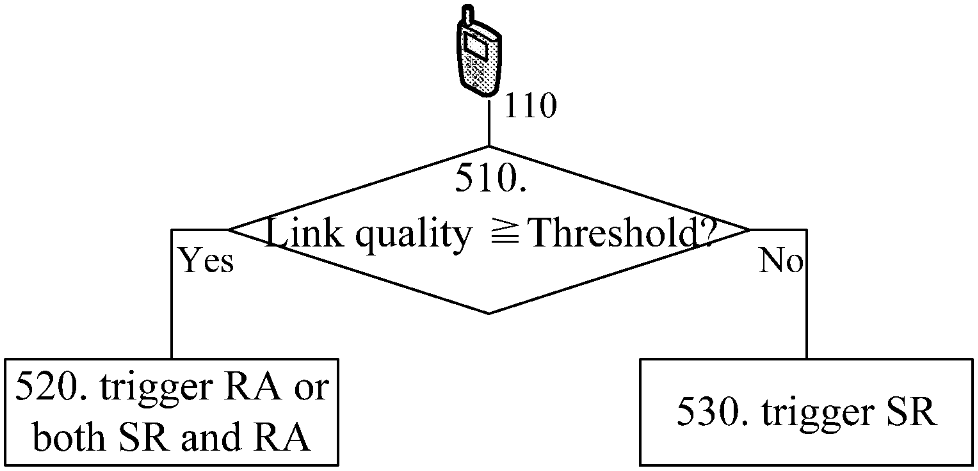
FIG. 6 is a schematic flowchart illustrating an example of selectively triggering one or both of a scheduling request procedure and a random access procedure according to an example embodiment.

FIG. 6 is a schematic flowchart illustrating an example of selectively triggering one or both of the SR procedure and the RA procedure according to an example embodiment. Referring to FIG. 6, at 510, the UE 110 may determine if the radio link between the UE 110 and the network has a quality better than or equal to a quality threshold. In some embodiments, the UE 110 may measure a reference signal received power (RSRP) and compare the measured RSRP (L1-RSRP) or its filtered value (L2/L3-RSRP) with a predetermined threshold. The predetermined threshold may be based on (e.g., equal to or a certain value higher than) e.g. the RA type selection threshold msgA-RSRP-Threshold, or it may be a new configurable threshold to evaluate the radio link quality of the UE 110. If the measured RSRP is higher than or equal to the threshold, it indicates that the UE 110 has good radio link quality and it can perform the 2-step RA procedure. On the other hand, if the measured RSRP is lower than the threshold, it indicates that the UE 110 has poor radio link quality and it would not perform the 2-step RA procedure. Instead, the UE 110 would select and perform the 4-step RA procedure. It would be appreciated that other measurements such as reference signal received quality (RSRQ), signal to interference and noise ratio (SINR) may also be used to evaluate the radio link quality.

If the UE 110 determines at 510 that the radio link quality is better than or equal to the quality threshold, the UE 110 may trigger the RA procedure or both the SR and RA procedure at 520 because it knows the 2-step RA procedure would be selected and performed due to the good radio link quality. As discussed above, the 2-step RA procedure can reduce the uplink scheduling delay by one RTT, and the parallel SR and RA procedures may operate to schedule the uplink transmission in a more timely manner. If the UE 110 determines at 510 that the radio link quality is worse than the quality threshold, the UE 110 may trigger the SR procedure at 530 because it knows if the RA procedure is triggered, the 4-step RA procedure would be selected due to the poor radio link quality and the 4-step RA procedure cannot reduce the uplink scheduling delay compared with the SR procedure. In this way, the UE 110 can avoid unnecessary 4-step RA procedure.

Figure 7:
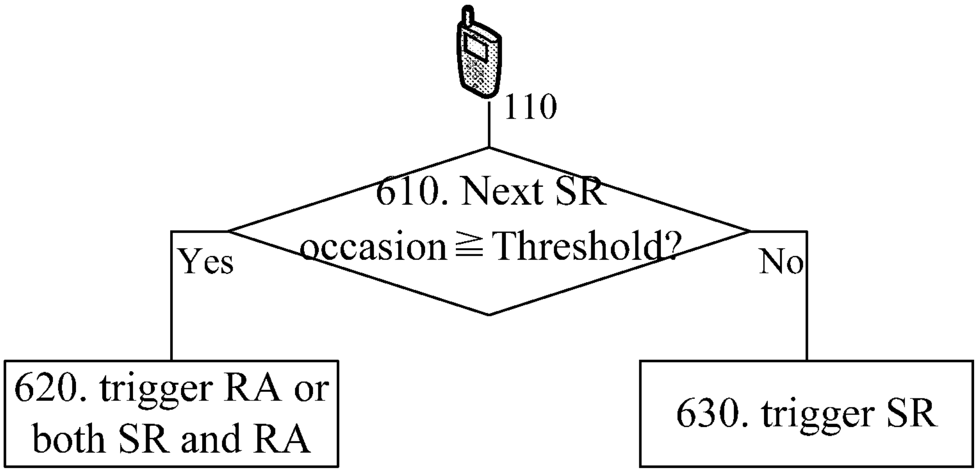
FIG. 7 is a schematic flowchart illustrating an example of selectively triggering one or both of a scheduling request procedure and a random access procedure according to an example embodiment.

FIG. 7 is a schematic flowchart illustrating an example of selectively triggering one or both of the SR procedure and the RA procedure according to an example embodiment. In the example of FIG. 7, selective triggering of one or both of the SR procedure and the RA procedure may be based on the transmission occasion of the SR. The UE may be configured with a periodicity $SR_{periodicity}$ in symbols or slots and an offset $SR_{offset}$ in slots by a higher layer parameter such as periodicityAndOffset for a PUCCH transmission conveying SR. With the periodicity $SR_{periodicity}$ and the offset $SR_{offset}$, the UE can determine the transmission occasions for the SR. Referring to FIG. 7, at 610, the UE 110 may calculate a time period to a next transmission occasion of the SR and determine if the time period is longer than or equal to a time threshold. If the UE 110 determines the time period to the next SR occasion is longer than or equal to the time threshold at 610, it may trigger the RA procedure or both the RA and SR procedures at 620 for faster uplink scheduling because the UE 110 knows that the SR will be transmitted more than the time threshold later and it may cause high scheduling delay. If the UE 110 determines the time period to the next SR occasion is shorter than the time threshold at 610, the UE 110 may trigger the SR procedure at 630 because it knows that the SR will be transmitted soon (within the time threshold) and the consequent scheduling delay would be acceptable.

Figure 8:
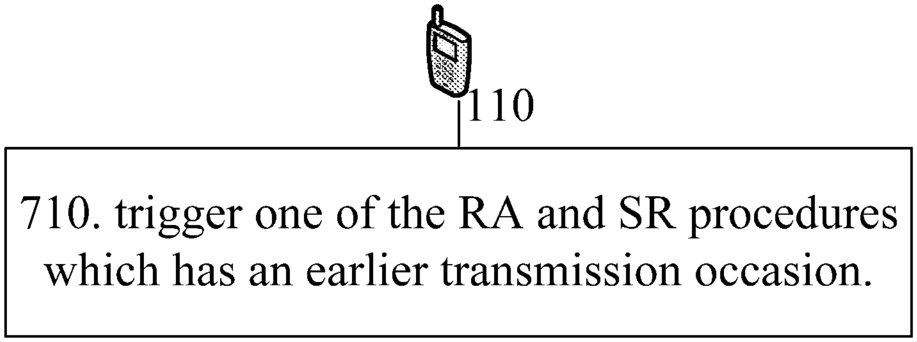
FIG. 8 is a schematic flowchart illustrating an example of selectively triggering one or both of a scheduling request procedure and a random access procedure according to an example embodiment.

FIG. 8 is a schematic flowchart illustrating an example of selectively triggering one or both of the SR procedure and the RA procedure according to an example embodiment. Referring to FIG. 8, at 710, the UE 110 may trigger one of the SR procedure and the RA procedure which has an earlier transmission occasion. As discussed above, the UE 110 can determine the transmission occasion for the SR based on the periodicity $SR_{periodicity}$ and the offset $SR_{offset}$ configured by the network. In addition, the UE 110 can determine the transmission occasion for the RA procedure based on PRACH configuration provided by the network. Thus, the UE 110 can determine which of the SR procedure and the RA procedure has a first coming transmission occasion and thereby trigger the earlier procedure.

Some example conditions for selectively triggering one or both of the SR procedure and the RA procedure have been discussed in conjunction with FIGS. 4-8. It would be appreciated that the above example conditions may be applied alone or in combination, and other conditions may also be used in selective triggering of the RA and SR procedures.

Figure 9:
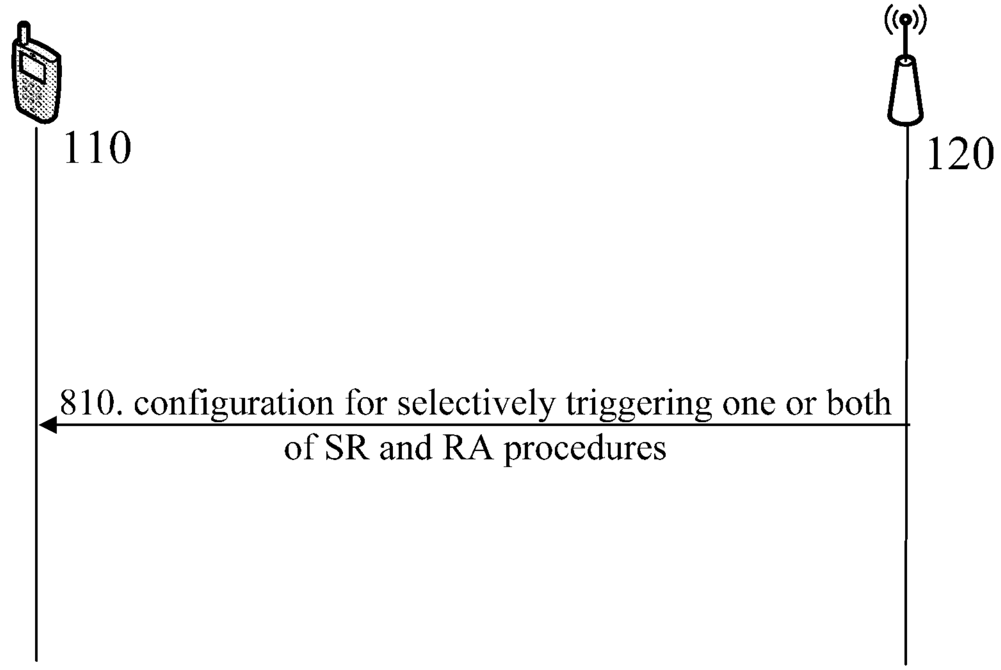
FIG. 9 is a schematic message flow diagram illustrating a procedure for configuring selective triggering conditions according to an example embodiment.

FIG. 9 is a schematic message flow diagram illustrating a procedure for configuring selective triggering conditions according to an example embodiment. Referring to FIG. 9, at 810, the UE 110 may receive from the gNB 120 configuration for selectively triggering one or both of the SR procedure and the RA procedure. For example, the gNB 120 may send the configuration when the UE 110 is connected to the gNB 120, or in response to a UE capability report received from the UE 110 indicating that the UE 110 is a NTN-capable UE and it supports the selective triggering of the RA and SR procedures. In some embodiments, the selective triggering configuration may comprise an indicator indicating if the selective triggering is enabled or disabled at the UE 110. If it is disabled, the UE 110 will trigger the SR procedure for a BSR and the RA procedure works as a fallback mechanism for the SR procedure. If the selective triggering is enabled, the UE 110 can selectively trigger one or both of the RA and SR procedures for the BSR, as discussed above. In some embodiments, the selective triggering configuration may comprise one or more indicators indicating if one or more logical channels (or logical channel groups) configured for the UE 110 is enabled to disabled to selectively trigger one or both of the SR and RA procedures. In some embodiments, the selective triggering configuration may comprise one or more parameters to configure the predetermined conditions for selectively triggering one or both of the SR and RA procedures. For example, the parameters may comprise the absolute or relative priority threshold, the radio link quality threshold, the time threshold, the RA type selection threshold and/or the like as discussed above with reference to FIGS. 4-8.

Figure 10:
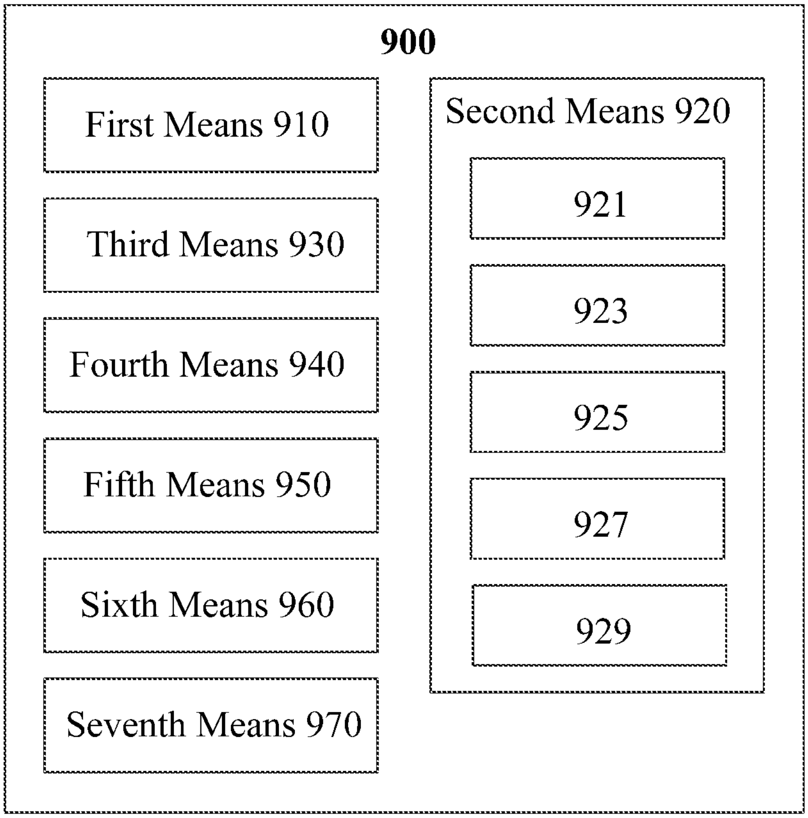
FIG. 10 is a functional block diagram illustrating an apparatus implemented at a user equipment device according to an example embodiment.

FIG. 10 is a functional block diagram illustrating an apparatus 900 according to an example embodiment. The apparatus 900 may be implemented at or as a part of a user equipment device such as the UE 110 discussed above. Referring to FIG. 10, the apparatus 900 may comprise a first means 910 for triggering a buffer status report (BSR) by uplink data arrival on a logical channel, and a second means 920 for selectively triggering one or both of a scheduling request (SR) procedure and a random access (RA) procedure based on a predetermined condition for transmission of the BSR.

In some embodiments, the second means 920 may comprise a means 921 for triggering the RA procedure or both the SR procedure and the RA procedure in a case where the logical channel which triggers the BSR has a priority higher than or equal to a first threshold, or triggering the SR procedure in a case where the logical channel which triggers the BSR has a priority lower than the first threshold.

In some embodiments, the second means 920 may comprise a means 923 for triggering one or both of the SR procedure and the RA procedure based on configuration for the logical channel which triggers the BSR.

In some embodiments, the second means 920 may comprise a means 925 for triggering the RA procedure or both the SR procedure and the RA procedure in a case where a radio link quality measurement for the terminal device is better than or equal to a second threshold, or triggering the SR procedure in a case where the radio link quality measurement for the terminal device is worse than the second threshold.

In some embodiments, the second means 920 may comprise a means 927 for triggering the RA procedure or both the SR procedure and the RA procedure in a case where a transmission occasion for the SR is a period of time away and the period of time is larger than or equal to a third threshold, or triggering the SR procedure in a case where a transmission occasion for the SR is within a period of time and the period of time is shorter than the third threshold.

In some embodiments, the second means 920 may comprise a means 929 for triggering one of the SR procedure and the RA procedure which has a transmission occasion earlier than the other.

In some embodiments, the apparatus 900 may further comprise a third means 930 for determining that a condition for triggering the SR procedure is satisfied before selectively triggering the SR procedure and the RA procedure.

In some embodiments, the apparatus 900 may further comprise a fourth means 940 for evaluating RA type selection between a 2-step RA procedure and a 4-step RA procedure when the RA procedure is triggered, and stopping the RA procedure and triggering the SR procedure if it has yet to be triggered, in a case where the 4-step RA procedure is to be selected.

In some embodiments, the apparatus 900 may further comprise a fifth means 950 for stopping the SR procedure if it has been triggered, when a network response is received in the RA procedure.

In some embodiments, the apparatus 900 may further comprise a sixth means 960 for stopping the RA procedure and/or the SR procedure if they are ongoing, when an uplink grant is received for transmission of the BSR.

In some embodiments, the apparatus 900 may further comprise a seventh means 970 for receiving from network configuration for selectively triggering one or both of the SR procedure and the RA procedure.

Figure 11:
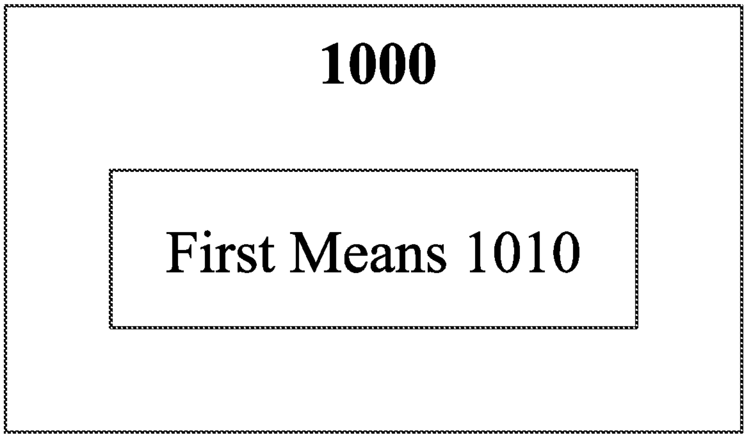
FIG. 11 is a functional block diagram illustrating an apparatus implemented at a network device according to an example embodiment.

FIG. 11 is a functional block diagram illustrating an apparatus 1000 according to an example embodiment. The apparatus 1000 may be implemented at or as a part of a network device such as the gNB 120 discussed above. Referring to FIG. 11, the apparatus 1000 may comprise a first means 1010 for providing configuration for selectively triggering one or both of a scheduling request (SR) procedure and a random access (RA) procedure to a terminal device. In some embodiments, the configuration for selectively triggering one or both of the SR procedure and the RA procedure may comprises an indicator indicating if the selective triggering is enabled or disabled at the terminal device, one or more indicators indicating if the selective triggering is enabled or disabled for one or more logical channels configured for the terminal device, respectively, and/or one or more parameters to configure one or more conditions for selectively triggering one or both of the SR procedure and the RA procedure.

Figure 12:
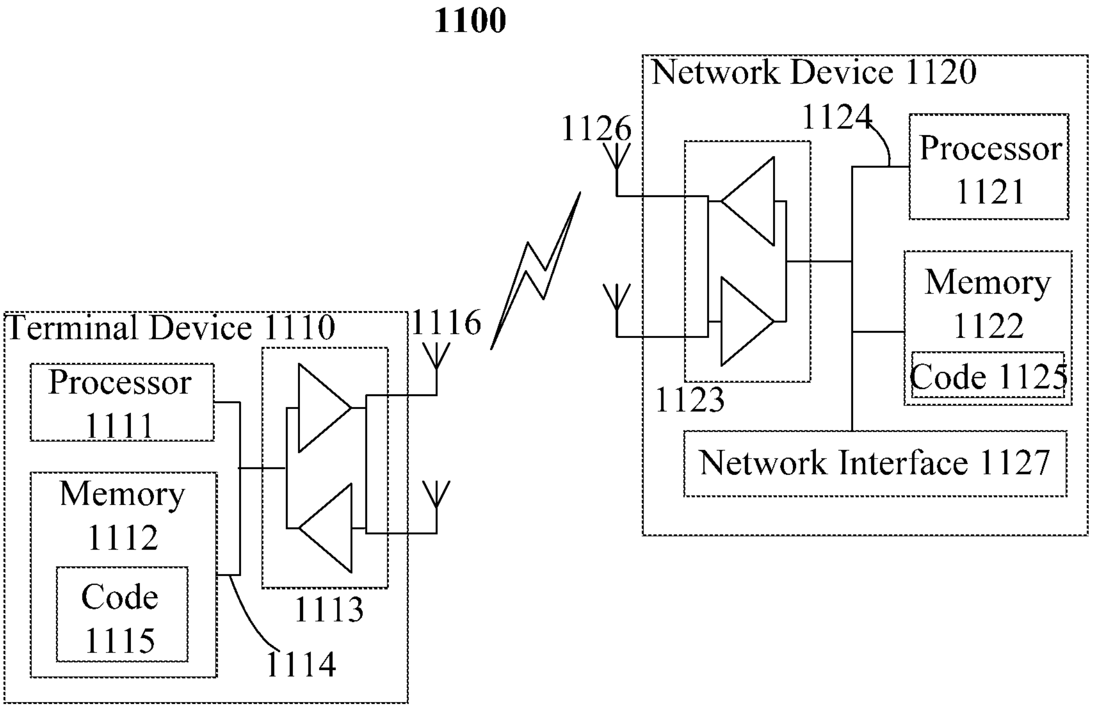
FIG. 12 illustrates a structural block diagram of a communication system according to an example embodiment.

FIG. 12 is a block diagram illustrating a communication system 1100 in which example embodiments of the present disclosure can be implemented. The communication system 1100 may be a part of a communication network, such as a non-terrestrial network or a terrestrial network. As shown in FIG. 12, the communication system 1100 may include a terminal device 1110 which may be implemented as the UE 110 discussed above, and a network device 1120 which may be implemented as the base station (gNB) 120 discussed above.

Referring to FIG. 12, the terminal device 1110 may comprise one or more processors 1111, one or more memories 1112 and one or more transceivers 1113 interconnected through one or more buses 1114. The one or more buses 1114 may be address, data, or control buses, and may include any interconnection mechanism such as series of lines on a motherboard or integrated circuit, copper cables, optical fibers, or other electrical/optical communication equipment, and the like. Each of the one or more transceivers 1113 may comprise a receiver and a transmitter, which are connected to a plurality of antennas 1116. The plurality of antennas 1116 may form an antenna array to perform beamforming communication with the network device 1120. The one or more memories 1112 may include computer program code 1115. The one or more memories 1112 and the computer program code 1115 may be configured to, when executed by the one or more processors 1111, cause the terminal device 1110 to perform procedures and steps relating to the UE 110 as described above.

The network device 1120 can be implemented as a single network node, or disaggregated/distributed over two or more network nodes, such as a central unit (CU), a distributed unit (DU), a remote radio head-end (RRH), using different functional-split architectures and different interfaces. The network device 1120 may comprise one or more processors 1121, one or more memories 1122, one or more transceivers 1123 and one or more network interfaces 1127 interconnected through one or more buses 1124. The one or more buses 1124 may be address, data, or control buses, and may include any interconnection mechanism such as a series of lines on a motherboard or integrated circuit, copper cables, optical fibers, or other electrical/optical communication equipment, and the like. Each of the one or more transceivers 1123 may comprise a receiver and a transmitter, which are connected to a plurality of antennas 1126. The network device 1120 may operate as a base station for the terminal device 1110 and wirelessly communicate with the terminal device 1110 through the plurality of antennas 1126. The plurality of antennas 1126 may form an antenna array to perform beamforming communication with the terminal device 1110. The one or more network interfaces 1127 may provide wired or wireless communication links through which the network device 1120 may communicate with other network devices, entities or functions. The one or more memories 1122 may include computer program code 1125. The one or more memories 1122 and the computer program code 1125 may be configured to, when executed by the one or more processors 1121, cause the network device 1120 to perform procedures and steps relating to the base station (gNB) 120 as described above.

The one or more processors 1111, 1121 discussed above may be of any appropriate type that is suitable for the local technical network, and may include one or more of general purpose processors, special purpose processor, microprocessors, a digital signal processor (DSP), one or more processors in a processor based multi-core processor architecture, as well as dedicated processors such as those developed based on Field Programmable Gate Array (FPGA) and Application Specific Integrated Circuit (ASIC). The one or more processors 1111, 1121 may be configured to control other elements of the UE/network device and operate in cooperation with them to implement the procedures discussed above.

The one or more memories 1112, 1122 may include at least one storage medium in various forms, such as a volatile memory and/or a non-volatile memory. The volatile memory may include but not limited to for example a random access memory (RAM) or a cache. The non-volatile memory may include but not limited to for example a read only memory (ROM), a hard disk, a flash memory, and the like. Further, the one or more memories 1112, 1122 may include but not limited to an electric, a magnetic, an optical, an electromagnetic, an infrared, or a semiconductor system, apparatus, or device or any combination of the above.

It would be understood that blocks in the drawings may be implemented in various manners, including software, hardware, firmware, or any combination thereof. In some example embodiments, one or more blocks may be implemented using software and/or firmware, for example, machine-executable instructions stored in the storage medium. In addition to or instead of machine-executable instructions, parts or all of the blocks in the drawings may be implemented, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-Chip systems (SOCs), Complex Programmable Logic Devices (CPLDs), etc.

Some example embodiments further provide computer program code or instructions which, when executed by one or more processors, may cause a device or apparatus to perform the procedures described above. The computer program code for carrying out procedures of the example embodiments may be written in any combination of one or more programming languages. The computer program code may be provided to one or more processors or controllers of a general purpose computer, special purpose computer, or other programmable data processing apparatus, such that the program code, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

Some example embodiments further provide a computer program product or a computer readable medium having the computer program code or instructions stored therein. The computer readable medium may be any tangible medium that may contain, or store a program for use by or in connection with an instruction execution system, apparatus, or device. The machine readable medium may be a machine readable signal medium or a machine readable storage medium. A machine readable medium may include but is not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular example embodiments. Certain features that are described in the context of separate example embodiments may also be implemented in combination in a single example embodiment. Conversely, various features that are described in the context of a single example embodiment may also be implemented in multiple example embodiments separately or in any suitable sub-combination.

Although the subject matter has been described in a language that is specific to structural features and/or method actions, it is to be understood the subject matter defined in the appended claims is not limited to the specific features or actions described above. On the contrary, the above-described specific features and actions are disclosed as an example of implementing the claims.

The invention claimed is:

1. A terminal device comprising:

at least one processor; and at least one memory including computer program code, the at least one memory and the computer program code configured to, with the at least one processor, cause the terminal device to:

trigger a buffer status report by uplink data arrival on a logical channel;

selectively trigger one or both of a scheduling request procedure and a random access procedure based on a predetermined condition for transmission of the triggered buffer status report; and when the random access procedure is triggered, evaluate random access type selection between a 2-step random access procedure and a 4-step random access procedure; and stop the random access procedure and triggering the scheduling request procedure if it has yet to be triggered, in a case where the 4-step random access procedure is to be selected.

2. The terminal device of claim 1 wherein the terminal device being caused to selectively trigger one or both of the scheduling request procedure and the random access procedure based on a predetermined condition comprises the terminal device being caused to:

trigger the random access procedure or both the scheduling request procedure and the random access procedure in a case where the logical channel which triggers the buffer status report has a priority higher than or equal to a first threshold; or trigger the scheduling request procedure in a case where the logical channel which triggers the buffer status report has a priority lower than the first threshold.

3. The terminal device of claim 2 wherein the first threshold is configured as an absolute priority threshold or a relative priority threshold, and the relative priority threshold is calculated from a highest priority of other logical channels containing available uplink data or from a lowest priority of other logical channels when none of the other logical channels contains available uplink data.

4. The terminal device of claim 1 wherein the terminal device being caused to selectively trigger one or both of the scheduling request procedure and the random access procedure based on a predetermined condition comprises the terminal device being caused to:

trigger one or both of the scheduling request procedure and the random access procedure based on configuration for the logical channel which triggers the buffer status report.

5. The terminal device of claim 1 wherein the terminal device being caused to selectively trigger one or both of the scheduling request procedure and the random access procedure based on a predetermined condition comprises the terminal device being caused to:

trigger the random access procedure or both the scheduling request procedure and the random access procedure in a case where a radio link quality measurement for the terminal device is better than or equal to a second threshold; or triggering the scheduling request procedure in a case where the radio link quality measurement for the terminal device is worse than the second threshold.

6. The terminal device of claim 1 wherein the terminal device being caused to selectively trigger one or both of the scheduling request procedure and the random access procedure based on a predetermined condition comprises the terminal device being caused to:

trigger the random access procedure or both the scheduling request procedure and the random access procedure in a case where a transmission occasion for the scheduling request is a period of time away and the period of time is larger than or equal to a third threshold; or trigger the scheduling request procedure in a case where a transmission occasion for the scheduling request is within a period of time and the period of time is shorter than the third threshold.

7. The terminal device of claim 1 wherein the terminal device being caused to selectively trigger one or both of the scheduling request procedure and the random access procedure based on a predetermined condition comprises the terminal device being caused to:

trigger one of the scheduling request procedure and the random access procedure which has a transmission occasion earlier than the other.

8. The terminal device of claim 1, wherein the terminal device is further caused to:

when a network response is received in the random access procedure, stop the scheduling request procedure if it has been triggered.

9. The terminal device of claim 1, wherein the terminal device is further caused to:

when an uplink grant is received for transmission of the buffer status report, stop the random access procedure and/or the scheduling request procedure if they are ongoing.

10. The terminal device of claim 1, wherein the terminal device is further caused to:

receive from network configuration for selectively triggering one or both of the scheduling request procedure and the random access procedure.

11. The terminal device of claim 10 wherein the configuration for selectively triggering one or both of the scheduling request procedure and the random access procedure comprises one or more of:

an indicator indicating if the selective triggering is enabled or disabled at the terminal device;

one or more indicators indicating if the selective triggering is enabled or disabled for one or more logical channels configured for the terminal device, respectively; and one or more parameters to configure the predetermined condition.

12. The terminal device of claim 1, wherein the terminal device is further caused to:

determine that a condition for triggering the scheduling request procedure is satisfied before the one or both of the scheduling request procedure and the random access procedure is selectively triggered.

13. A method implemented at a terminal device comprising:

triggering a buffer status report by uplink data arrival on a logical channel;

selectively triggering one or both of a scheduling request procedure and a random access procedure based on a predetermined condition for transmission of the triggered buffer status report; and when the random access procedure is triggered, evaluating random access type selection between a 2-step random access procedure and a 4-step random access procedure; and stopping the random access procedure and triggering the scheduling request procedure if it has yet to be triggered, in a case where the 4-step random access procedure is to be selected.

14. The method of claim 13 wherein selectively triggering one or both of the scheduling request procedure and the random access procedure based on a predetermined condition comprises:

triggering the random access procedure or both the scheduling request procedure and the random access procedure in a case where the logical channel which triggers the buffer status report has a priority higher than or equal to a first threshold; or triggering the scheduling request procedure in a case where the logical channel which triggers the buffer status report has a priority lower than the first threshold.

15. The method of claim 13 wherein selectively triggering one or both of the scheduling request procedure and the random access procedure based on a predetermined condition comprises:

triggering one or both of the scheduling request procedure and the random access procedure based on configuration for the logical channel which triggers the buffer status report.

16. The method of claim 13 wherein selectively triggering one or both of the scheduling request procedure and the random access procedure based on a predetermined condition comprises:

triggering the random access procedure or both the scheduling request procedure and the random access procedure in a case where a radio link quality measurement for the terminal device is better than or equal to a second threshold; or triggering the scheduling request procedure in a case where the radio link quality measurement for the terminal device is worse than the second threshold.

17. The method of claim 13 wherein selectively triggering one or both of the scheduling request procedure and the random access procedure based on a predetermined condition comprises:

triggering the random access procedure or both the scheduling request procedure and the random access procedure in a case where a transmission occasion for the scheduling request is a period of time away and the period of time is larger than or equal to a third threshold; or triggering the scheduling request procedure in a case where a transmission occasion for the scheduling request is within a period of time and the period of time is shorter than the third threshold.

18. The method of claim 13 wherein selectively triggering one or both of the scheduling request procedure and the random access procedure based on a predetermined condition comprises:

triggering one of the scheduling request procedure and the random access procedure which has a transmission occasion earlier than the other.

* * * * *